(12) United States Patent
Liang et al.

(10) Patent No.: US 10,983,620 B2
(45) Date of Patent: Apr. 20, 2021

(54) TOUCH DISPLAY MODULE, CONTROLLING METHOD, PANEL AND DISPLAY DEVICE

(71) Applicants: Chongqing BOE Optoelectronics Technology Co., Ltd., Chongqing (CN); BOE Technology Group Co., Ltd., Beijing (CN)

(72) Inventors: Xuebo Liang, Beijing (CN); Xiuzhu Tang, Beijing (CN); Shuai Chen, Beijing (CN); Shuang Hu, Beijing (CN); Xing Dong, Beijing (CN); Lijun Xiong, Beijing (CN); Zhenguo Tian, Beijing (CN); Taoliang Tang, Beijing (CN); Zhi Wang, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/604,672

(22) PCT Filed: May 22, 2019

(86) PCT No.: PCT/CN2019/088016
§ 371 (c)(1),
(2) Date: Oct. 11, 2019

(87) PCT Pub. No.: WO2019/223734
PCT Pub. Date: Nov. 28, 2019

(65) Prior Publication Data
US 2020/0233514 A1    Jul. 23, 2020

(30) Foreign Application Priority Data
May 25, 2018    (CN) .......................... 201810560712.7

(51) Int. Cl.
*G06F 3/044*    (2006.01)
*G06F 3/041*    (2006.01)
*G09G 3/20*    (2006.01)

(52) U.S. Cl.
CPC .......... *G06F 3/0412* (2013.01); *G06F 3/0416* (2013.01); *G06F 3/04164* (2019.05); *G06F 3/0443* (2019.05); *G06F 2203/04103* (2013.01)

(58) Field of Classification Search
CPC .......... G06F 3/0412; G06F 3/041; G06F 3/03; G06F 3/01; G06F 3/00;
(Continued)

(56) References Cited

U.S. PATENT DOCUMENTS

| 8,405,086 B1 | 3/2013 | Hou |
| 9,958,995 B2 | 5/2018 | Jin |

(Continued)

FOREIGN PATENT DOCUMENTS

| CN | 104517572 A | 4/2015 |
| CN | 104820514 A | 8/2015 |

(Continued)

OTHER PUBLICATIONS

First Office Action, including Search Report, for Chinese Patent Application No. 201810560712.7, dated Nov. 1, 2019, 21 pages.

*Primary Examiner* — Julie Anne Watko
(74) *Attorney, Agent, or Firm* — Westman, Champlin & Koehler, P.A.

(57) ABSTRACT

A touch display module, a controlling method, a panel and a display device are provided in embodiments of the disclosure, all belong to the technical field of display technology, the touch display module including: a touch circuit, an auxiliary circuit, a base substrate, a plurality of electrode blocks and a plurality of electrode lines; the touch circuit is configured to provide the plurality of electrode lines with (Continued)

respective display signals at a display stage, and to provide the plurality of electrode lines with respective touch signals at a touch stage; and the auxiliary circuit is configured to provide the plurality of electrode lines with respective display signals at the display stage, and to stop providing the plurality of electrode lines with the respective display signals at the touch stage.

3 Claims, 8 Drawing Sheets

(58) Field of Classification Search
CPC . G06F 2203/04103; G06F 2203/04104; G06F 2203/041; G06F 2203/00; G06F 3/0416; G06F 3/04164; G06F 3/0443; G06F 3/04166; G09G 3/20
See application file for complete search history.

(56) References Cited

U.S. PATENT DOCUMENTS

| | | |
|---|---|---|
| 10,318,087 B2 | 6/2019 | Jin |
| 10,371,980 B2 | 8/2019 | Zou et al. |
| 2006/0274029 A1* | 12/2006 | Hong ................... G09G 3/20 345/104 |
| 2007/0105286 A1 | 5/2007 | Huh et al. |
| 2015/0287751 A1 | 10/2015 | Jin et al. |
| 2016/0291711 A1 | 10/2016 | Jin |
| 2016/0349921 A1 | 12/2016 | Mizuhashi et al. |
| 2018/0217701 A1 | 8/2018 | Jin |
| 2018/0373080 A1 | 12/2018 | Zou et al. |
| 2019/0227671 A1 | 7/2019 | Hu et al. |

FOREIGN PATENT DOCUMENTS

| | | |
|---|---|---|
| CN | 105094431 A | 11/2015 |
| CN | 105335010 A | 2/2016 |
| CN | 105335012 A | 2/2016 |
| CN | 106020556 A | 10/2016 |
| CN | 106055156 A | 10/2016 |
| CN | 106652870 A | 5/2017 |
| CN | 106933414 A | 7/2017 |
| CN | 107123387 A | 9/2017 |
| CN | 107132685 A | 9/2017 |
| CN | 107515701 A | 12/2017 |
| CN | 107863340 A | 3/2018 |
| CN | 108628499 A | 10/2018 |

* cited by examiner providing the plurality of electrode lines with the display signals by the touch circuit, and providing the plurality of electrode lines with the display signals by the auxiliary circuit, at the display stage — 701 providing the plurality of electrode lines with the touch signals by the touch circuit, and stopping providing the plurality of electrode lines with the display signals by the auxiliary circuit, at the touch stage — 702

Fig.7

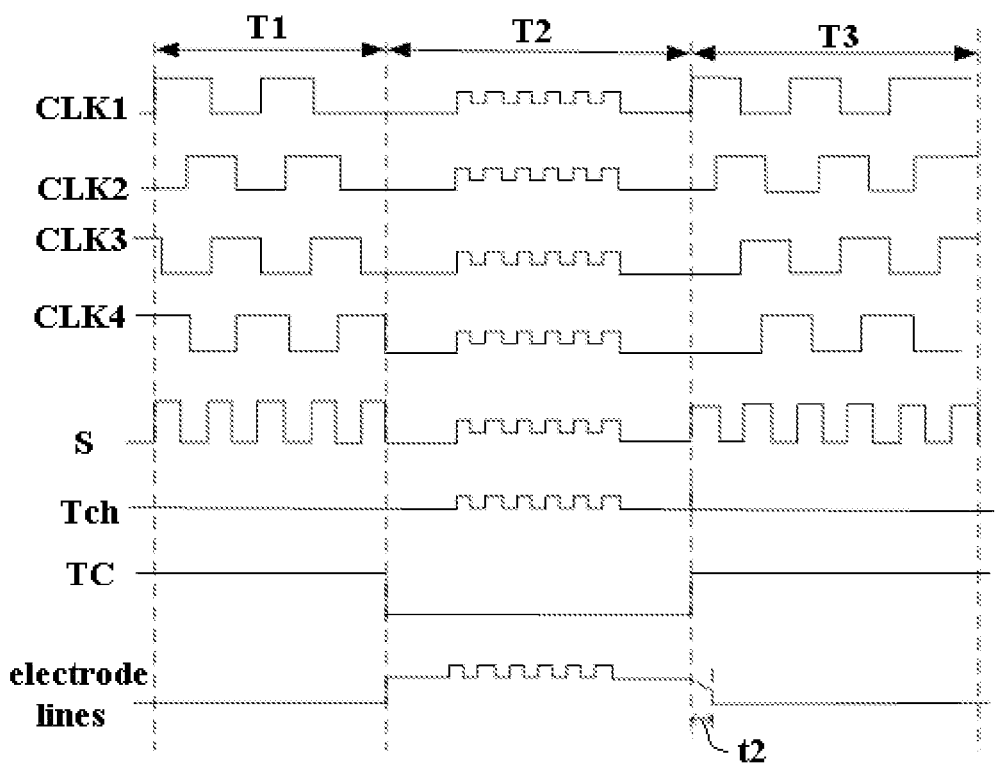

Fig.8

TOUCH DISPLAY MODULE, CONTROLLING METHOD, PANEL AND DISPLAY DEVICE

CROSS-REFERENCE TO RELATED INVENTION

This application is a Section 371 National Stage Application of International Application No. PCT/CN2019/088016, filed on May 22, 2019, entitled "TOUCH DISPLAY MODULE, CONTROLLING METHOD, PANEL AND DISPLAY DEVICE", which has not been published yet, which claims priority to Chinese Patent Application Invention No. 201810560712.7 filed on May 25, 2018, entitled "ARRAY SUBSTRATE AND METHOD FOR DRIVING THE SAME, DISPLAY DEVICE", in the China National Intellectual Property Administration, the whole disclosure of which is incorporated herein by reference.

BACKGROUND OF THE DISCLOSURE

Field of the Disclosure

Embodiments of the present disclosure generally relate to the technical field of display technology, and in particular, to a touch display module, a controlling method, a panel and a display device.

Description of the Related Art

A touch display panel of Full in cell type typically comprises: a touch circuit, an array substrate, and both a plurality of electrode lines and a plurality of electrode blocks provided on the array substrate. The plurality of electrode blocks are electrically connected with the touch circuit through the plurality of electrode lines respectively, and the plurality of electrode lines are configured to transmit respective touch signals between the plurality of electrode blocks and the touch circuit.

In relevant art, a time period for the touch display panel to display a frame image for example comprises a display stage and a touch stage. In the display stage, the touch circuit for example provides a common voltage signal to the plurality of electrode blocks respectively, through the plurality of electrode lines, so as to drive the touch display panel to display images. In the touch stage, the touch circuit for example provides respective touch signals to the plurality of electrode blocks respectively, through the plurality of electrode lines, so as to implement a detection of a specific touch position within the touch display panel by utilizing the plurality of electrode blocks (for example to detect variance of voltages among the plurality of electrode blocks) and the like to sense a specific touch action applied thereon.

SUMMARY OF THE DISCLOSURE

The embodiments of the present disclosure have been made to overcome or alleviate at least one aspect of the above mentioned disadvantages and/or shortcomings in the prior art, by providing a touch display module, a controlling method, a panel and a display device.

Following technical solutions are adopted in exemplary embodiments of the disclosure.

According to one aspect of embodiments of the disclosure, there is provided a touch display module, comprising: a base substrate, a touch circuit and an auxiliary circuit arranged respectively at both ends of the base substrate opposite to each other, and a plurality of electrode blocks and a plurality of electrode lines both being located on the base substrate; the plurality of electrode blocks and the plurality of electrode lines are arranged in one-to-one correspondence, and are all located between the touch circuit and the auxiliary circuit; each of the plurality of electrode lines is electrically connected at one end thereof with the touch circuit and electrically connected at the other end thereof with the auxiliary circuit, and portions of each of the plurality of electrode lines between the one end and the other end thereof are electrically connected with a respective one of the plurality of electrode blocks; the touch circuit is configured to provide the plurality of electrode lines with respective display signals at a display stage, and to provide the plurality of electrode lines with respective touch signals at a touch stage; and the auxiliary circuit is configured to additionally provide the plurality of electrode lines with respective supplementary display signals at the display stage, and to stop providing the plurality of electrode lines with the respective supplementary display signals at the touch stage.

According to embodiments of the disclosure, the auxiliary circuit is located within a non-display region at a periphery of the base substrate, the non-display region surrounding and defining a display region located inside the base substrate.

According to embodiments of the disclosure, each of the display signals and the supplementary display signals comprises a common voltage signal.

According to embodiments of the disclosure, the plurality of electrode blocks and the plurality of electrode lines are all located within the display region of the base substrate;

the touch display module further comprises a transmission line located within the non-display region of the base substrate, and the transmission line is electrically connected at one end thereof with the touch circuit and electrically connected at the other end thereof with the auxiliary circuit;

the touch circuit is further configured to provide the auxiliary circuit with the display signals through the transmission line at the display stage; and the auxiliary circuit is configured to provide the plurality of electrode lines with the display signals at the display stage, which display signals are provided by the touch circuit and function as the supplementary display signals.

According to embodiments of the disclosure, the touch display module further comprises: a control line located within the non-display region of the base substrate, and the control line is electrically connected at one end thereof with the touch circuit and electrically connected at the other end thereof with the auxiliary circuit;

the touch circuit is further configured to provide the auxiliary circuit with a first control signal through the control line at the display stage, and to provide the auxiliary circuit with a second control signal through the control line at the touch stage; and the auxiliary circuit is configured to provide the plurality of electrode lines with the display signals which are provided by the touch circuit and function as the supplementary display signals, in response to the first control signal being received by the auxiliary circuit, and to stop providing the plurality of electrode lines with the display signals, in response to the second control signal being received by the auxiliary circuit.

According to embodiments of the disclosure, the plurality of electrode lines, the transmission line and the control line are electrically connected with different terminals of the touch circuit respectively.

According to embodiments of the disclosure, the transmission line is located between the control line and the plurality of electrode blocks.

According to embodiments of the disclosure, the plurality of electrode blocks are located between a portion of the transmission line along a longitudinal direction and a portion of the control line extending along the longitudinal direction.

According to embodiments of the disclosure, the auxiliary circuit comprises a plurality of sub-circuits electrically connected with the plurality of electrode lines in one-to-one correspondence, respectively, and the plurality of sub-circuits are electrically connected with both the control line and the transmission line;

the plurality of sub-circuits are configured to establish an electrical communication between the transmission line and respective electrode lines corresponding to the plurality of sub-circuits and in turn to provide the respective electrode lines with the display signals which are provided by the touch circuit, in response to the first control signal being received by the plurality of sub-circuits, and to shut off the electrical communication between the transmission line and the respective electrode lines corresponding to the plurality of sub-circuits so as to stop providing the respective electrode lines with the display signals which are provided by the touch circuit, in response to the second control signal being received by the plurality of sub-circuits.

According to embodiments of the disclosure, each of the plurality of sub-circuits comprises a transistor;

a gate of the transistor is electrically connected with the control line, and a first electrode of the transistor is electrically connected with the transmission line, and a second electrode of the transistor is electrically connected with a respective one of the electrode lines corresponding to the sub-circuit; and an electrical communication is established between the first electrode and the second electrode, in response to the first control signal being received by the gate; and the electrical communication between the first electrode and the second electrode is shut off, in response to the second control signal being received by the gate.

According to embodiments of the disclosure, the touch display module further comprises an insulating layer;

the insulating layer is located between the plurality of electrode blocks and the plurality of electrode lines, and the plurality of electrode lines are electrically connected with respective ones of the plurality of electrode blocks through one or more via-holes passing through the insulating layer.

According to embodiments of the disclosure, each of the plurality of electrode lines is electrically connected with the respective one of the plurality of electrode blocks, through two respective via-holes passing through the insulating layer.

According to embodiments of the disclosure, the touch display module comprises an array substrate which comprises the base substrate, the plurality of electrode blocks and the plurality of electrode lines.

According to another aspect of the exemplary embodiment of the present disclosure, there is provided a touch display controlling method of a touch display module, the touch display module comprising a base substrate, a touch circuit and an auxiliary circuit arranged respectively at both ends of the base substrate opposite to each other, and a plurality of electrode blocks and a plurality of electrode lines both being located on the base substrate; the plurality of electrode blocks and the plurality of electrode lines being arranged in one-to-one correspondence, and are all located between the touch circuit and the auxiliary circuit, each of the plurality of electrode lines being electrically connected at one end thereof with the touch circuit and electrically connected at the other end thereof with the auxiliary circuit, and portions of each of the plurality of electrode lines between the one end and the other end thereof being electrically connected with a respective one of the plurality of electrode blocks, the method comprising:

providing the plurality of electrode lines with the display signals by the touch circuit, and providing the plurality of electrode lines with the supplementary display signals by the auxiliary circuit, at a display stage; and providing the plurality of electrode lines with the touch signals by the touch circuit, and stopping providing the plurality of electrode lines with the supplementary display signals by the auxiliary circuit, at a touch stage.

According to embodiments of the disclosure, each of the display signals and the supplementary display signals comprises a common voltage signal.

According to embodiments of the disclosure, in response to a condition that the touch display module comprises a transmission line, which is located within a non-display region situating at a periphery of the base substrate and surrounding and defining a display region located inside the base substrate, and the transmission line is electrically connected at one end thereof with the touch circuit and electrically connected at the other end thereof with the auxiliary circuit, the method further comprises: providing the auxiliary circuit with the display signals through the transmission line by the touch circuit, at the display stage; and the step "providing the plurality of electrode lines with the supplementary display signals by the auxiliary circuit" comprises: providing the plurality of electrode lines with the display signals by the auxiliary circuit, which display signals are provided by the touch circuit and function as the supplementary display signals.

According to embodiments of the disclosure, in response to a condition that the touch display module further comprises a control line, which is located within a non-display region situating at a periphery of the base substrate and surrounding and defining a display region located inside the base substrate, and the control line is electrically connected at one end thereof with the touch circuit and electrically connected at the other end thereof with the auxiliary circuit, the method further comprises: providing the auxiliary circuit with a first control signal through the control line by the touch circuit at the display stage, and providing the auxiliary circuit with a second control signal through the control line by the touch circuit at the touch stage;

the step "providing the plurality of electrode lines with the display signals by the auxiliary circuit, which display signals are provided by the touch circuit and function as the supplementary display signals" comprises: providing the plurality of electrode lines with the display signals by the auxiliary circuit, which display signals are provided by the touch circuit and function as the supplementary display signals, by the auxiliary circuit, in response to the first control signal being received by the auxiliary circuit; and the step "stopping providing the plurality of electrode lines with the supplementary display signals by the auxiliary circuit" comprises: stopping providing the plurality of electrode lines with the display signals, by the auxiliary circuit, in response to the second control signal being received by the auxiliary circuit.

According to embodiments of the disclosure, in response to a condition that the auxiliary circuit comprises a plurality of sub-circuits electrically connected with the plurality of electrode lines in one-to-one correspondence, respectively, and the plurality of sub-circuits are electrically connected with both the control line and the transmission line, the step "providing the plurality of electrode lines with the display signals by the auxiliary circuit, which display signals are provided by the touch circuit and function as the supplementary display signals, by the auxiliary circuit, in response to the first control signal being received by the auxiliary circuit" comprises: establishing an electrical communication between the transmission line and a respective one of the plurality of electrode lines corresponding to each of the plurality of sub-circuits and in turn providing the respective one of the plurality of electrode lines with a respective display signal provided by the touch circuit, in response to the first control signal being received by each of the plurality of sub-circuits; and the step "stopping providing the plurality of electrode lines with the display signals, by the auxiliary circuit, in response to the second control signal being received by the auxiliary circuit" comprises: shutting off the electrical communication between the transmission line and the respective one of the plurality of electrode lines corresponding to each of the plurality of sub-circuits so as to stop providing the respective one of the plurality of electrode lines with the respective display signal provided by the touch circuit, in response to the second control signal being received by each of the plurality of sub-circuits.

According to another aspect of the exemplary embodiment of the present disclosure, there is provided a touch display panel, comprising the touch display module as above.

According to another aspect of the exemplary embodiment of the present disclosure, there is provided a display device comprising the touch display panel as above.

BRIEF DESCRIPTION OF THE DRAWINGS

The drawings are used to provide a further understanding of the technical scheme of the present disclosure embodiments and form part of the specification. The drawings, together with the embodiments of the present application, are used to explain the technical solution of the present disclosure embodiments, but fail to constitute a limitation on the technical solution of the present disclosure embodiments. Shapes and sizes of various components in the drawings do not reflect the true proportions, and are intended only to illustrate the contents of the present disclosure.

FIG. 7 illustrates a flow char of a touch display controlling method according to exemplary embodiments of the disclosure;

FIG. 8 illustrates a timing sequence diagram involved in a touch display controlling method according to some other exemplary embodiments of the disclosure;

DETAILED DESCRIPTION OF PREFERRED EMBODIMENTS OF THE INVENTION

In order to make operation principles, technical solutions and advantages of the present disclosure clearer, embodiments of the present disclosure will be described in further detail below in conjunction with the accompanying drawings.

Transistors used in all embodiments of the disclosure are for example thin film transistors, or field-effect transistors, or other devices having same or similar properties, or the like. In each of the transistors used herein, respective source electrode and drain electrode are arranged symmetrically, and therefore are interchangeable. In embodiments of the disclosure, for example, the source electrode is referred to as a first electrode, and the drain electrode is referred to as a second electrode. According to specific forms of devices as illustrated, it is specified that for each of the transistors, a middle terminal thereof is a gate electrode, a signal input terminal thereof is the source electrode, and a signal output terminal is the drain electrode. In addition, each of the transistors used in embodiments of the disclosure for example comprises either type of a P-type transistor (which turns on in a condition that the gate electrode is at a relatively low gate level, and cuts off in a condition that the gate electrode is at a relatively high gate level) and a N-type transistor (which turns on in a condition that the gate electrode is at a relatively high gate level and cuts off in a condition that the gate electrode is at a relatively low gate level). Moreover, each of a plurality of signals in embodiments of the disclosure has a respective first potential and a respective second potential corresponding thereto, the first potential and the second potential merely indicate that specific potential of a respective signal has two quantities of state (e.g., different from each other), rather than indicating that the first potential or the second potential has a certain quantitative/numerical value throughout the disclosure.

Figure 1:
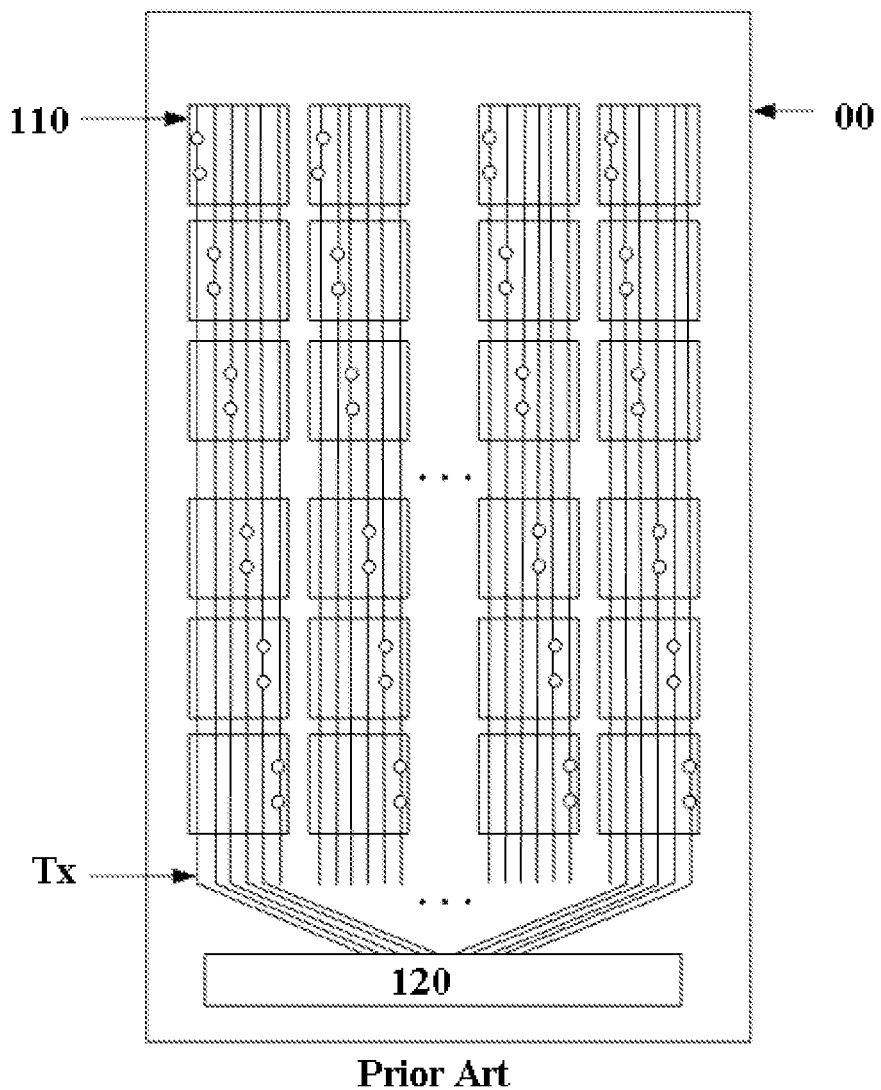
FIG. 1 illustrates a structural schematic view of a touch display module according to a relevant art.

FIG. 1 illustrates a structural schematic view of a touch display module according to a relevant art. As illustrated in FIG. 1, the touch display module comprises: a base substrate 00, a plurality of electrode blocks 110 and a plurality of electrode lines Tx both on the base substrate 00, and a touch circuit 120 disposed at an end of the base substrate 00 and connected with the plurality of electrode lines as illustrated.

In the relevant art, in order to increase a touch reporting rate of the touch display panel (i.e., a specific number of times of reporting information of touch points per second by the touch circuit, which it represents/characterizes a degree of restoration of tracing records of a touch trajectory), then, in a display process of a frame image, touch stages (for example, at least two touch stages) are typically inserted in a segmented manner. By way of example, a time period in which a display scanning is performed on a plurality of rows of pixels each time during a process of displaying a frame image is defined as a display stage; accordingly, by way of example, after a display scanning is performed on a plurality of rows of pixels each time, a touch scanning is in turn carried out on the plurality of rows of pixels, then, a time period in which the touch scanning is performed on the plurality of rows of pixels each time during the process of displaying a frame image is defined as a touch stage. Specifically, the touch reporting rate of the touch display panel is defined as a specific number of times of reporting touch positions within the touch display module in a unit time.

Figure 2:
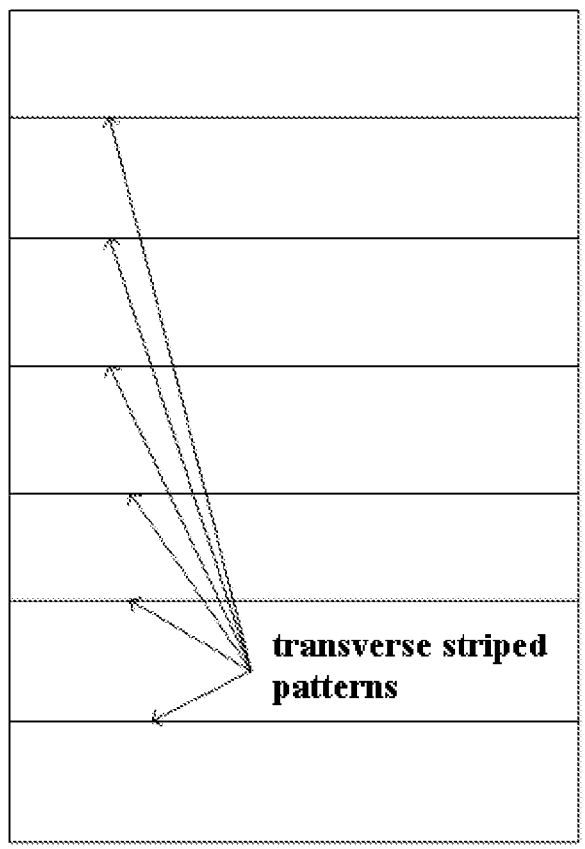
FIG. 2 illustrates a schematic view of (transverse) striped patterns formed in an image display by a display panel in the relevant art.

However, in consideration that the touch circuit is generally provided at one end of the a display substrate (for example, on the display substrate, the plurality of electrode blocks, the plurality of electrode lines and the base substrate are located), then lengths of the plurality of electrode lines which are connected between the plurality of electrode blocks and the touch circuit are different from one another. In a transition process in which the touch stage is transited towards the display stage, common voltage signals which originate from the touch circuit and are then received by some electrode blocks located at an end of the display substrate distal to (i.e., being away from) the touch circuit have relatively large delay and relatively large voltage drop, resulting in a plurality of transverse striped patterns as illustrated in FIG. 2 may for example appear on the touch display panel when displaying images thereon.

Meanwhile, in the display stage, since the plurality of electrode blocks which are located at different positions are at distances from the touch circuit, respectively, then, in a comparison between common voltage signals received by some electrode blocks located at the end of the display substrate distal to (i.e., being away from) the touch circuit and common voltage signals received by some other electrode blocks located at an end of the display substrate proximal to (i.e., being next to) the touch circuit, a relatively large difference exists therebetween (i.e., a difference in their respective common voltage signals for example occupies a relatively large proportion as compared with common voltage signals originally outputted by the touch circuit). As such, it results in inconsistence in display brightness at different positions of the touch display module, also influencing a display effect of the touch display module.

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the disclosure in view of attached drawings should not be construed as being limited to the embodiment set forth herein; rather, these embodiments are provided so that the present disclosure will be thorough and complete, and will fully convey the general concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective dimension and shape of each component in the drawings are only intended to exemplarily illustrate the contents of the disclosure, rather than to demonstrate the practical dimension or proportion of components of the touch display module, the panel, and the display device.

According to a general technical concept of the present disclosure, in one aspect of embodiments of the disclosure, in order to make clearer the technical problem to be solved, the technical solution and technical advantage of the embodiments of the disclosure, more detailed depictions will be made hereinafter in view of accompanying drawings and specific embodiments.

Figure 3:
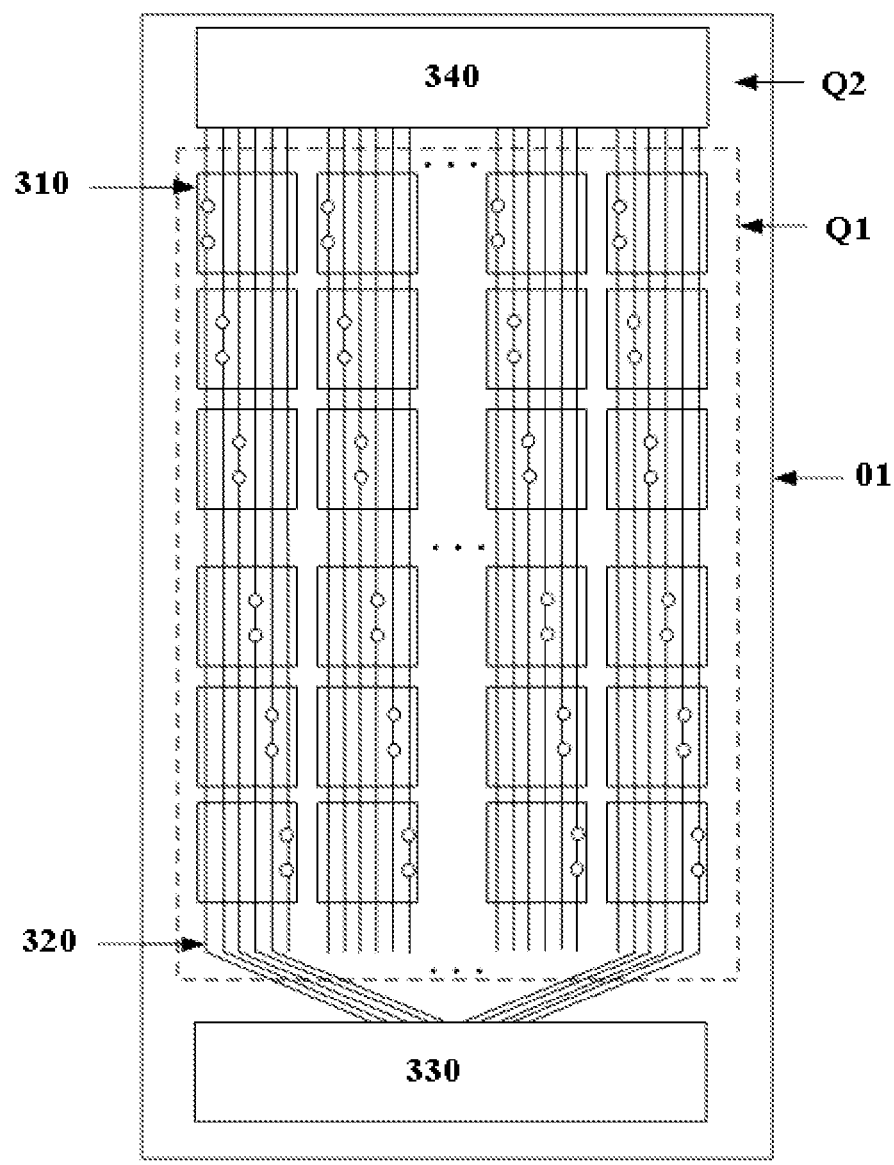
FIG. 3 illustrates a structural schematic view of another touch display module according to exemplary embodiments of the disclosure.

A touch display module is provided in embodiments of the disclosure, intending to solve a problem that a touch display panel in the relevant art has a relatively poor display effect. As illustrated in FIG. 3, the touch display module for example comprises: a base substrate 01, a plurality of electrode blocks 310, a plurality of electrode lines 320, a touch circuit 330 and an auxiliary circuit 340.

Both the plurality of electrode blocks 310 and the plurality of electrode lines 320 are located on the base substrate 01, and both the touch circuit 330 and the auxiliary circuit 340 are located on the base substrate 01 at two ends thereof opposite to each other; and moreover, both the plurality of electrode blocks 310 and the plurality of electrode lines 320 are located between the touch circuit 330 and the auxiliary circuit 340. The plurality of electrode blocks 310 and the plurality of electrode lines 320 are arranged in one-to-one correspondence (i.e., in a relationship that they are connected with each other in one-to-one correspondence, respectively), each of the plurality of electrode lines 320 is electrically connected at one end thereof with the touch circuit 330 and electrically connected at the other end thereof with the auxiliary circuit 340, and portions of each of the plurality of electrode lines (320) between the one end and the other end thereof are electrically connected with a respective one of the plurality of electrode blocks 310.

The touch circuit 330 is for example configured to provide the plurality of electrode lines 320 with respective display signals at a display stage, and to provide the plurality of electrode lines 320 with respective touch signals at a touch stage; the auxiliary circuit 340 is for example configured to additionally provide the plurality of electrode lines 320 with respective supplementary display signals at the display stage, and to stop providing the plurality of electrode lines 320 with the respective supplementary display signals at the touch stage. By doing so, at the display stage, not only the touch circuit 330 provides the one end of each of the plurality of electrode lines 320 with respective display signals, but also the auxiliary circuit 340 provides the other end of each of the plurality of electrode lines 320 with respective supplementary display signals.

To sum up, the touch display module according to embodiments of the disclosure not only comprises the touch circuit, but also comprises the auxiliary circuit, and the plurality of electrode blocks and the plurality of electrode lines are all located between the touch circuit and the auxiliary circuit, and each of the plurality of electrode lines is electrically connected at both ends thereof with the touch circuit and the auxiliary circuit, respectively. Moreover, since the touch circuit and the auxiliary circuit are capable of providing the plurality of electrode lines with respective display signals and respective supplementary display signals, respectively; then, both end of each of the plurality of electrode lines may transmit signals for implementing display functionality (i.e., respective display signal, and respective supplementary display signal) and provide the respective one of the plurality of electrode blocks with the signals for implementing display functionality, simultaneously, decreasing delay and voltage drop of display signals which would have been received by electrode blocks distal to (i.e., being away from) the touch circuit in a condition in the relevant art that display signals are merely provided by a touch circuit located at one end of a base substrate 01.

In exemplary embodiments of the disclosure, each of the display signals and the supplementary display signals as mentioned above for example comprises a common voltage signal; then the plurality of electrode blocks are used as a common electrode at the display stage, and are used as touch electrodes at the touch stage. Certainly, each of the display signals and the supplementary display signals as mentioned above may also for example not be a common voltage signal, by way of example, each of the display signals and the supplementary display signals as mentioned above may also for example alternatively be pixel voltage signals, without being limited specifically in embodiments of the disclosure.

In addition, since the plurality of electrode blocks are multiplexed to be a common electrode or touch electrodes, in a time-division manner, and the common electrode may typically be located inside the touch display panel, then, the touch display panel in which the touch display module according to embodiments of the disclosure is located is essentially a touch display panel of Full in cell type. Furthermore, the touch display panel typically comprises two display substrate disposed opposite to each other, and the common electrode may for example be arranged on either one of the two display substrates, one of which is referred to as an array substrate; and in the embodiments of the disclosure, the common electrode is exemplified to be located on the array substrate. In a condition that the common electrode is located on the array substrate, the touch display module comprises the array substrate, and the array substrate for example comprises the base substrate 01, the plurality of electrode blocks 310 and the plurality of electrode lines 320, as mentioned above.

In exemplary embodiments of the disclosure, the plurality of electrode blocks 310 as illustrated in FIG. 3 comprise electrode blocks 310 arranged in a multi-row and multi-column layout in a matrix, e.g., there are 576 electrode blocks 310 arranged in 32 rows and in 18 columns (i.e., 32×18=576); accordingly, the touch display module comprises 576 electrode lines 320 in one-to-one correspondence with the 576 electrode blocks. A material of aforementioned electrode lines 320 may for example be a metallic material (such as copper and the like) or a non-metallic material (such as indium tin oxide (ITO), and the like).

In exemplary embodiments of the disclosure, each of aforementioned electrode lines 320 may for example be in a form of straight line shape, and be parallel to a column direction of the electrode blocks 310. An orthogonal projection of each of the plurality of electrode lines 320 on the base substrate 01 may for example at least partially overlap with an orthogonal projection of a respective one of the plurality of electrode blocks 310 on the base substrate 01, and may further for example at least partially overlap with an orthogonal projection of a column of electrode blocks 310 in which the respective one of the plurality of electrode blocks 310 is situated, on the base substrate.

In exemplary embodiments of the disclosure, the touch circuit 330 is for example located at a data binding terminal, i.e., a "Data Pad" (abbreviated as DP) of the base substrate 01, and the auxiliary circuit 340 is for example located at an opposite data binding terminal, i.e., a "Data Pad Opposite" (abbreviated as DPO). It should be noticed that, the touch circuit 330 and the auxiliary circuit 340 are for example chosen to be arranged on the base substrate 01, and are for example alternatively chosen to be arranged outside the base substrate 01, without being limited in this connection in embodiments of the disclosure; and in embodiments of the disclosure, the touch circuit 330 and the auxiliary circuit 340 are exemplified to be all located on the base substrate 01. Moreover, the plurality of electrode blocks 310 and the plurality of electrode lines 320 are for example all located in a display region Q1 on the base substrate 01 (e.g., arranged inside the base substrate 01, as illustrated), and the touch circuit 330 and the auxiliary circuit 340 are all located in a non-display region Q2 on the base substrate 01 (e.g., arranged at a periphery of the base substrate 01, the periphery surrounding and defining the inside of the base substrate 01).

Figure 4:
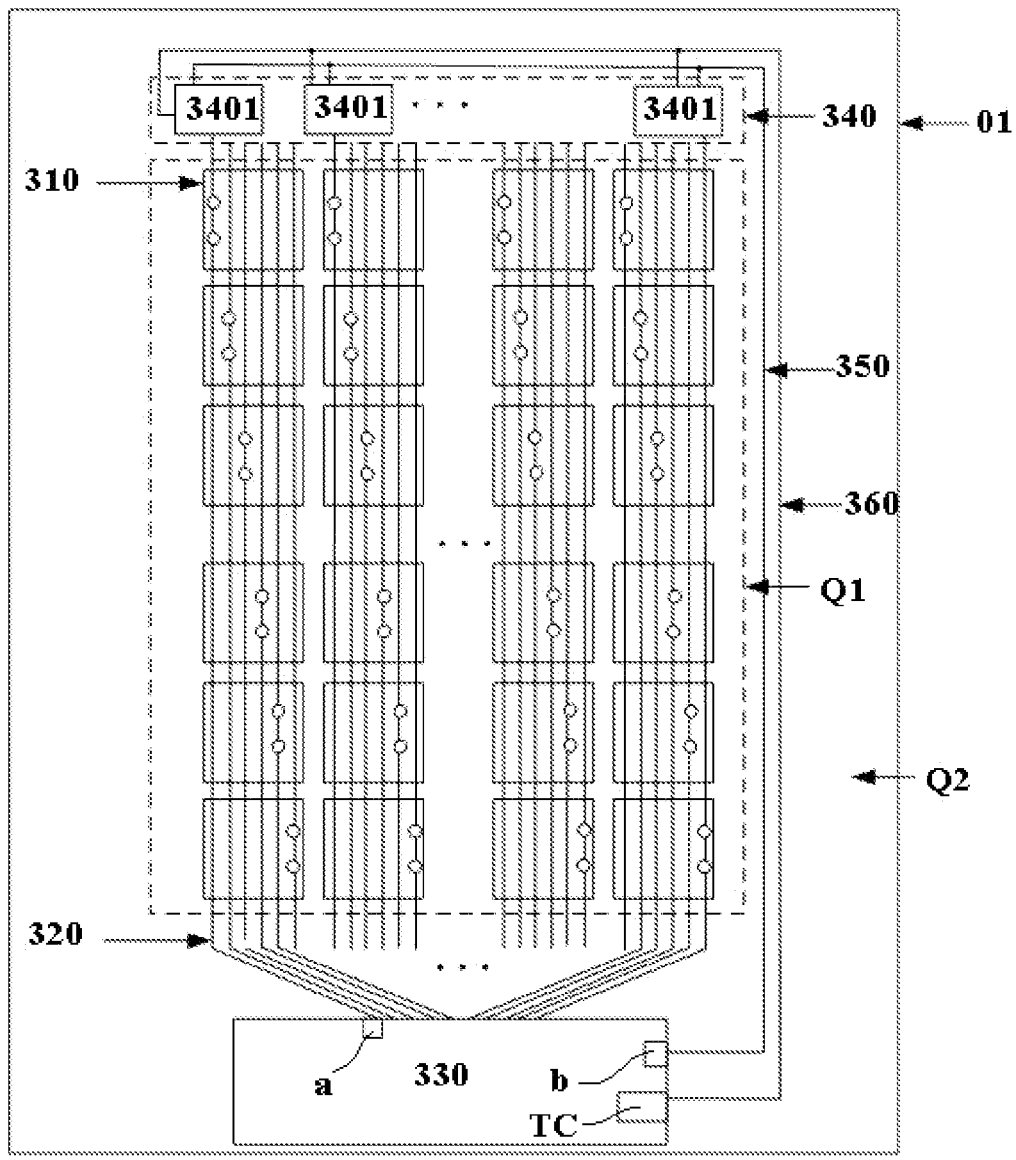
FIG. 4 illustrates a structural schematic view of another touch display module according to exemplary embodiments of the disclosure.

FIG. 4 illustrates a structural schematic view of another touch display module according to exemplary embodiments of the disclosure; as illustrated in FIG. 4, on the basis of FIG. 3, the auxiliary circuit 340 for example comprises a plurality of sub-circuits 3401 arranged in one-to-one correspondence with the plurality of electrode lines 320 respectively (i.e., in a relationship that they are connected with each other in one-to-one correspondence, respectively). Exemplarily, provided that the touch display module comprises 576 electrode blocks 310 arranged in 32 rows and in 18 columns, accordingly, the touch display module comprises 576 electrode lines 320 in one-to-one correspondence with the 576 electrode blocks respectively (i.e., in a relationship that they are connected with each other in one-to-one correspondence, respectively), and 576 sub-circuits 3401 in one-to-one correspondence with the 576 electrode lines 320 respectively (i.e., in a relationship that they are connected with each other in one-to-one correspondence, respectively). Each sub-circuit 3401 is for example electrically connected with a respective electrode line 320, and is for example configured to provide the respective electrode line 320 with a respective one of supplementary display signals as above at the display stage, and to stop providing the respective electrode line 320 with the respective one of supplementary display signals at the touch stage.

In exemplary embodiments of the disclosure, above touch display module for example further comprises a transmission line 350 located within the non-display region Q2 of the base substrate 01, and the transmission line 350 is electrically connected at one end thereof with the touch circuit 330 (e.g., the transmission line 350 is electrically connected at one end thereof with a second output terminal 'b' of the touch circuit 330) and electrically connected at the other end thereof with the auxiliary circuit 340 (e.g., the transmission line 350 is electrically connected at the other end thereof with the plurality of sub-circuits 3401 of the auxiliary circuit, respectively). It can be seen that, the supplementary display signals provided to the plurality of electrode lines 320 by the auxiliary circuit 340 at the display stage are essentially still the display signals originating from the touch circuit 330; as such, it is ensured that there exists an consistence between respective display signals provided by the touch circuit and the auxiliary circuit.

Exemplarily, in specific embodiments, in a condition that the auxiliary circuit 340 comprises the plurality of sub-circuits 3401, the other end of the transmission line 350 is for example electrically connected with each of the plurality of sub-circuits 3401. The touch circuit 330 is for example further configured to provide each of the plurality of sub-circuits 3401 with respective one of the display signals as above through the transmission line 350 at the display stage. And at the touch stage, the display signals are prevented from being provided to the auxiliary circuit through the transmission line. At that time, each of the plurality of sub-circuits 3401 is for example configured to establish an electrical communication between the respective one of the plurality of electrode lines 320 (i.e., an electrode line in connection with the sub-circuit) and the transmission line 350, and in turn to provide the respective one of the plurality of electrode lines 320 with the respective display signal provided by the touch circuit 330, at the display stage; and also configured to shut off the electrical communication between the respective one of the plurality of electrode lines 320 and the transmission line 350, and in turn to stop providing the respective one of the plurality of electrode lines 320 with the respective display signal provided by the touch circuit 330, at the touch stage.

It should also be noted that, the plurality of electrode lines 320 are all located within the display region Q1 of the base substrate 01, and the transmission line 350 is located within the non-display region Q2 of the base substrate 01. As compared with the non-display region Q2, there exist relatively more conductive structures (such as aforementioned electrode blocks, other electrodes in addition to the electrode blocks, and the like) in the display region Q1 of the base substrate 01, thus there are relatively more interference being applied on the signals when they are transmitted on the plurality of electrode lines 320 in the display region Q1, resulting in a relatively slow signal transmission speed. Accordingly, as compared with the display region Q1, there exist relatively less conductive structures (e.g., the transmission line as above), thus there are relatively less interference being applied on the signals when they are transmitted on the transmission line 350 in the non-display region Q2, resulting in a relatively fast signal transmission speed. Therefore, it requires much less time for transmitting the display signals outputted by the touch circuit 330 the display stage through the transmission line 350 located within the non-display region Q2 to the auxiliary circuit 340, as compared with a time for transmitting the display signals outputted by the touch circuit 330 the display stage through the plurality of electrode lines 320 located within the display region Q1 to the plurality of electrode blocks 310. By doing so, it may be readily to implement that the touch circuit 330 and the auxiliary circuit 340 provide signals to the plurality of electrode lines 320 almost simultaneously, so as to achieve a purpose that respective total display signals received by the plurality of electrode blocks which are connected with the plurality of electrode lines 320 are essentially consistent with one another.

In exemplary embodiments of the disclosure, by continuing to refer to FIG. 4, the touch display module for example further comprises a control line 360 located within the non-display region Q2 of the base substrate 01, and the control line 360 is electrically connected at one end thereof with the touch circuit 330 (more specifically, electrically connected at one end thereof with a control terminal 'TC' within the touch circuit 330) and electrically connected at the other end thereof with the auxiliary circuit 340. In addition to a condition that the touch circuit 330 is configured to provide the plurality of electrode lines with display signals at the display stage and to provide the plurality of electrode lines with touch signals at the touch stage (even the touch circuit is configured to provide the auxiliary circuit with display signals through the transmission line 350 at the display stage, and to stop providing the auxiliary circuit with display signals through the transmission line 350 at the touch stage, the touch circuit 330 is for example further configured to provide the auxiliary circuit 340 with a first control signal through the control line 360 at the display stage, and to provide the auxiliary circuit 340 with a second control signal through the control line 360 at the touch stage. Accordingly, the auxiliary circuit 340 is for example specifically configured to provide the plurality of electrode lines 320 with the display signals which are provided by the touch circuit 330 and function as the supplementary display signals, when the first control signal is received by the auxiliary circuit, and to stop providing the plurality of electrode lines 320 with the display signals, when the second control signal is received by the auxiliary circuit. The auxiliary circuit 340 provides the plurality of electrode lines 320 with the display signals at the display stage and stop providing the plurality of electrode lines 320 with the display signals at the touch stage, under the control of the touch circuit 330.

Exemplarily, in a condition that the auxiliary circuit 340 comprises the plurality of sub-circuits 3401, the other end of control line 360 is for example electrically connected with each of the plurality of sub-circuits 3401, respectively. The touch circuit 330 is for example further configured to provide each of the plurality of sub-circuits 3401 with the first control signal through the control line 360 at the display stage, and to provide each of the plurality of sub-circuits 3401 with the second control signal through the control line 360 at the touch stage. At this time, each of the plurality of sub-circuits 3401 is for example configured to establish an electrical communication between the transmission line 350 and a respective one of the plurality of electrode lines 320 corresponding to each of the plurality of sub-circuits 3401 (i.e., a respective one of the plurality of electrode lines 320 in connection with each of the plurality of sub-circuits 3401) and in turn to provide the respective one of the plurality of electrode lines 320 with a respective display signal provided by the touch circuit 330, when the first control signal is received by each of the plurality of sub-circuits 3401; and is configured to shut off the electrical communication between the transmission line 350 and a respective one of the plurality of electrode lines 320 corresponding to each of the plurality of sub-circuits 3401 so as to stop providing respective one of the plurality of electrode lines 320 with the respective display signal, when the second control signal is received by each of the plurality of sub-circuits 3401.

It should be noted that, a potential of the first control signal is for example a first potential, and a potential of the second control signal is for example a second potential. As compared with the second potential, the first potential may for example be a relatively low potential and may for example alternatively be a relatively high potential, without being specifically restricted in this connection in embodiments of the disclosure.

In embodiments of the disclosure, the touch circuit 330 may for example be provided with a plurality of terminals, and the plurality of electrode lines, the control line and the transmission line are electrically connected with different ones of the plurality of terminals, respectively. As illustrated in FIG. 4, the plurality of terminals for example comprise a plurality of first output terminals 'a' which are electrically connected with the plurality of electrode lines 320 in one-to-one correspondence, respectively (FIG. 4 schematically illustrates merely one first output terminal), a second output terminal 'b' electrically connected with the transmission line 350, and a control terminal electrically connected with the control line 360.

Figure 5:
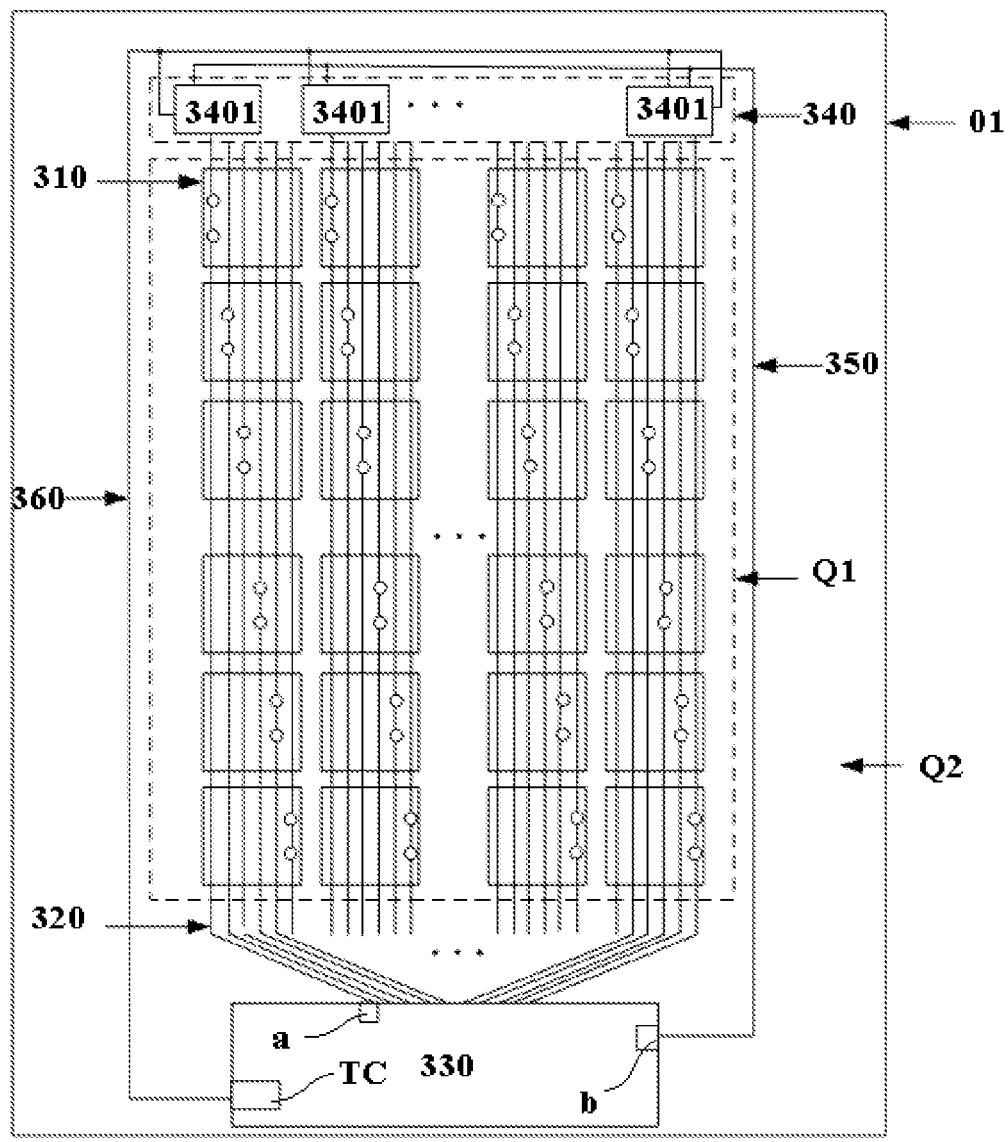
FIG. 5 illustrates a structural schematic view of another touch display module according to exemplary embodiments of the disclosure.

In addition, the transmission line 350 and the control line 360 are for example located on a same lateral side (i.e., "same side" as referred to hereinafter) or different lateral sides (i.e., "different sides" as referred to hereinafter) of the plurality of electrode blocks 310 (the "lateral side" here means that a extending direction thereof is a transverse direction orthogonal to sides of both ends the display substrate where the touch circuit 330 and the auxiliary circuit 340 are located). In a condition that the transmission line 350 and the control line 360 are located on a same side of the plurality of electrode blocks 310, the transmission line 350 is for example located between the control line 360 and the plurality of electrode blocks 310 and extends along a longitudinal direction of the display substrate orthogonal to the transverse direction (e.g., as illustrated in FIG. 4), and/or the control line 360 is located between the transmission line 350 and the plurality of electrode blocks 310 and extends along the longitudinal direction orthogonal to the transverse direction. In a condition that the transmission line 350 and the control line 360 are located on different sides of the plurality of electrode blocks 310 (e.g., as illustrated in FIG. 4), the plurality of electrode blocks 310 are located between a portion of the transmission line 350 extending along the longitudinal direction and a portion of the control line 360 extending along the longitudinal direction (e.g., as illustrated in FIG. 5), then, respective widths of regions on both sides of the plurality of electrode blocks within the base substrate 01 are similar to each other, and elements and circuits of the touch display panel where the touch display module is located are arranged in a relatively aesthetic manner.

Figure 6:
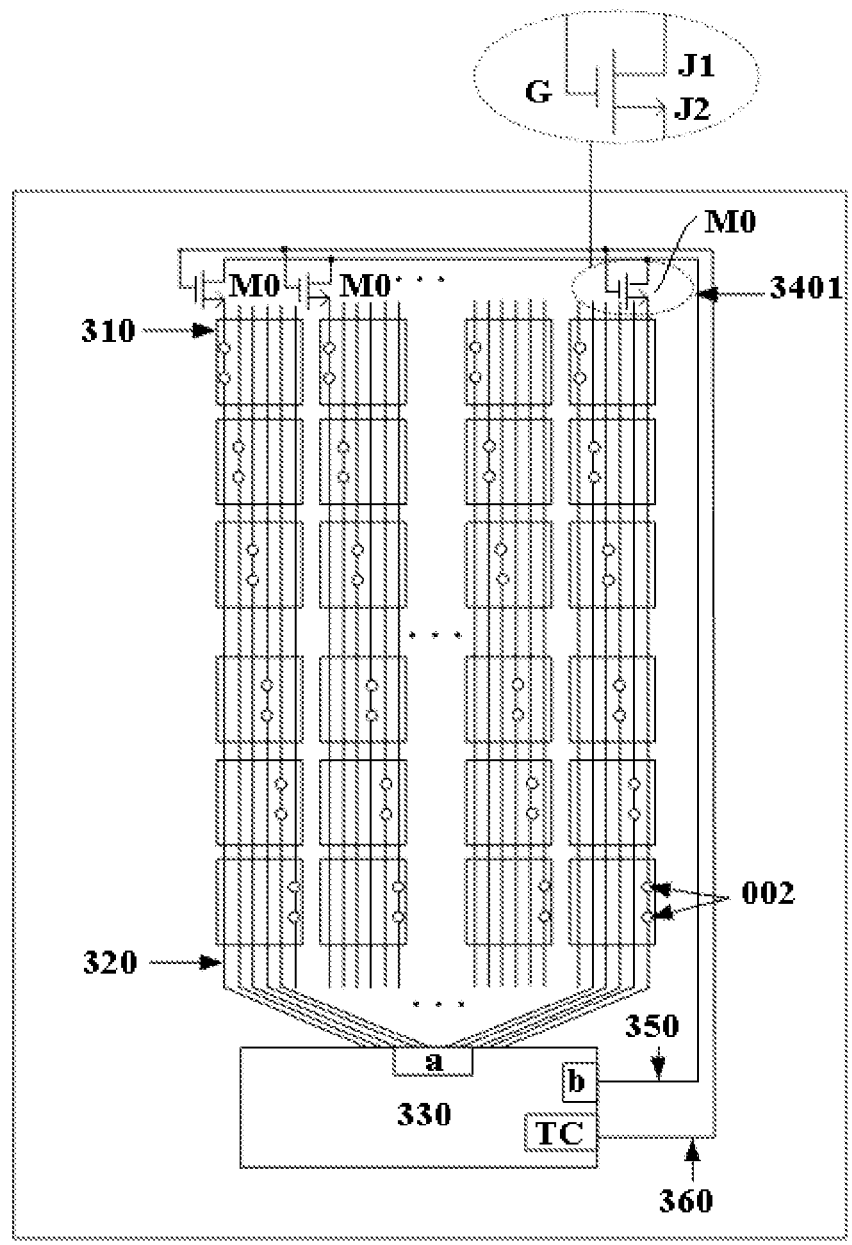
FIG. 6 illustrates a structural schematic view of another touch display module according to exemplary embodiments of the disclosure.

FIG. 6 illustrates a structural schematic view of another touch display module according to exemplary embodiments of the disclosure. As illustrated in FIG. 6, each of the plurality of sub-circuits 3401 for example comprises a transistor M0. A gate G of the transistor M0 is electrically connected with the control line 360, and a first electrode J1 of the transistor M0 is electrically connected with the transmission line 350, and a second electrode J2 of the transistor M0 is electrically connected with the other end of a respective one of the electrode lines 320 corresponding to the sub-circuit 3401. As to each transistor M0, when the first control signal is received by the gate G, an electrical communication is established between the first electrode J1 and the second electrode J2; and when the second control signal is received by the gate G, the electrical communication between the first electrode J1 and the second electrode J2 is shut off, such that the electrical communication between the transmission line 350 and the respective one of the electrode lines 320 is shut off.

Exemplarily, the transistor M0 is for example a N-type transistor or a P-type transistor, without being specifically restricted in this connection in embodiments of the disclosure. Provided that a potential of the first control signal is a first potential, and a potential of the second control signal is a second potential. Then, in a condition that the transistor M0 is the N-type transistor, as compared with the second potential, the first potential may for example be a relatively high potential; and in a condition that the transistor M0 is the P-type transistor, as compared with the second potential, the first potential may for example be a relatively low potential, without being specifically restricted in this connection in embodiments of the disclosure.

In exemplary embodiments of the disclosure, in a condition that the plurality of electrode blocks and the plurality of electrode lines are not provided in a same layer, the touch display module for example further comprises an insulating layer (which is merely illustrated schematically in FIG. 6, and is for example provided on a layer different from the plurality of electrode blocks 310 and the plurality of electrode lines 320, more specifically at least partially overlap with the plurality of electrode blocks 310 and the plurality of electrode lines 320), and the insulating layer is for example located between the plurality of electrode blocks 310 and the plurality of electrode lines 320. Moreover, a plurality of via-holes 002 are provided through the insulating layer, and each of the plurality of electrode lines 320 is for example electrically connected with the respective one of the plurality of electrode blocks 310, through one or more via-holes passing through the insulating layer. In embodiments of the disclosure, a case in which each of the plurality of electrode lines 320 is for example electrically connected with the respective one of the plurality of electrode blocks 310 through two respective via-holes passing through the insulating layer is taken as an example (by way of example, these two via-holes are used for passing therethrough both a section of the respective one of the plurality of electrode lines which is connected with the touch circuit 330, and a section of the respective one of the plurality of electrode lines which is connected with the auxiliary circuit 340, so as to electrically with the respective one of the plurality of electrode blocks 310).

In addition, by way of example, in a condition that the touch display module comprises an array substrate, the array substrate further comprises structures such as pixel electrodes, and thin film transistors configured to drive the pixel electrodes, and the like. The pixel electrodes are for example located at a side of the plurality of electrode blocks facing away from the base substrate, and are for example alternatively located at a side of the plurality of electrode blocks facing towards the base substrate. The thin film transistors in above sub-circuits are for example structures provided in a same layer as the thin film transistors provided in the array substrate and configured to drive the pixel electrodes, and both the transmission line and the control line are in a same layer as the plurality of electrode lines. It should be noted that, two structures are structures provided in a same layer with each other means that, these two structures are for example formed simultaneously, i.e., when one structure is formed, for example, the other structure is formed at the same time. More specifically, as used herein, a term "same layer" refers to a relationship between multiple layers formed simultaneously in one and the same step; and the term "same layer" does not always mean that various layers are completely flush with each other or one another, nor does it always mean that thicknesses or heights of various layers are the same in a cross-sectional view.

In exemplary embodiments of the disclosure, the touch display module provided herein for example further comprises a gate driving circuit, one or more clock signal sources (such as two, four, six or eight clock signal sources) and a source driving circuit. The gate driving circuit for example comprises at least two shift register units which are cascaded, and the gate driving circuit is electrically connected to the one or more clock signal sources.

To sum up, the touch display module according to embodiments of the disclosure comprises not only the touch circuit arranged at one end of the display substrate, but also the auxiliary circuit arranged at the opposite end of the display substrate, and the plurality of electrode blocks and the plurality of electrode lines are located between the touch circuit and the auxiliary circuit, and both ends of each of the plurality of electrode lines are electrically connected with the touch circuit and the auxiliary circuit, respectively. Furthermore, since both the touch circuit and the auxiliary circuit are capable of providing multiple electrode lines with display signals at the display stage, then, the display signals are for example transmitted simultaneously at both ends of each of the plurality of electrode lines, respectively, decreasing both delay and voltage drop of display signals which would have been received by electrode blocks distal to (i.e., being away from) the touch circuit in a condition in the relevant art that display signals are merely provided by a touch circuit located at one end of the base substrate.

FIG. 7 illustrates a flow char of a touch display controlling method according to exemplary embodiments of the disclosure. As illustrated in FIG. 7, the method comprises:

Step 701, providing the plurality of electrode lines with the display signals by the touch circuit, and providing the plurality of electrode lines with the supplementary display signals by the auxiliary circuit, at the display stage.

Step 702, providing the plurality of electrode lines with the touch signals by the touch circuit, and stopping providing the plurality of electrode lines with the supplementary display signals by the auxiliary circuit, at the touch stage.

To sum up, the touch display module as applied in the touch display controlling method according to embodiments of the disclosure comprises not only the touch circuit arranged at one end of the display substrate, but also the auxiliary circuit arranged at the opposite end of the display substrate, and the plurality of electrode blocks and the plurality of electrode lines are located between the touch circuit and the auxiliary circuit, and both ends of each of the plurality of electrode lines are electrically connected with the touch circuit and the auxiliary circuit, respectively. Furthermore, since both the touch circuit and the auxiliary circuit are capable of providing multiple electrode lines with display signals and supplementary display signals at the display stage, respectively, then, the display signals and the supplementary display signals are for example transmitted simultaneously at both ends of each of the plurality of electrode lines, respectively, decreasing both delay and voltage drop of display signals which would have been received by electrode blocks distal to (i.e., being away from) the touch circuit in a condition in the relevant art that display signals are merely provided by a touch circuit located at one end of the base substrate.

In exemplary embodiments of the disclosure, the display signals provided by the touch circuit to the plurality of electrode lines are capable of driving the touch display panel where the touch display module is located to display images. A process of displaying a frame of image by the touch display panel comprises multiple display stages, for example with a touch stage being inserted between every two adjacent display stages. Exemplarily, the display stage is for example a time period during which several rows of pixels are scanned when the touch display panel is driven by a drive module (e.g., of the touch circuit). The touch circuit for example provides various connecting lines with respective touch scanning signals, e.g., during a touch stage at the end of each display stage and before a next display stage. That is to say, the touch circuit may carry out a task of touch-scanning for a period of time (i.e. the touch stage) after the driver module completes scanning several rows of pixels each time.

In exemplary embodiments of the disclosure, as illustrated in FIG. 4, the touch display module comprises a transmission line 350 located within the non-display region Q2 of the base substrate 01, and the transmission line 350 is electrically connected at one end thereof with the touch circuit 330 and electrically connected at the other end thereof with the auxiliary circuit 340. Then, the touch display controlling method according to embodiments of the disclosure for example further comprises providing the auxiliary circuit with the display signals through the transmission line by the touch circuit, at the display stage; and stopping providing the auxiliary circuit with the display signals through the transmission line by the touch circuit, at the touch stage. At the display stage, the auxiliary circuit for example provides the plurality of electrode lines with the display signals, which display signals are provided by the touch circuit and function as the supplementary display signals. It can be seen that, the supplementary display signals provided to the plurality of electrode lines 320 by the auxiliary circuit 340 at the display stage are essentially still the display signals originating from the touch circuit 330; as such, it is ensured that there exists an consistence between respective display signals provided by the touch circuit and the auxiliary circuit.

Exemplarily, in a condition that the auxiliary circuit comprises the plurality of sub-circuits, the other end of the transmission line is for example electrically connected with each of the plurality of sub-circuits. The touch circuit provides each of the plurality of sub-circuits with respective one of the display signals as above through the transmission line at the display stage. At that time, each of the plurality of sub-circuits establishes an electrical communication between the respective one of the plurality of electrode lines and the transmission line, and in turn to provide the respective one of the plurality of electrode lines with respective supplementary display signal, i.e., the respective display signal provided by the touch circuit, at the display stage; and each of the plurality of sub-circuits shuts off the electrical communication between the respective one of the plurality of electrode lines and the transmission line, and in turn to stop providing the respective one of the plurality of electrode lines with essentially the respective display signal provided by the touch circuit, at the touch stage.

In exemplary embodiments of the disclosure, by continuing to refer to FIG. 4, the touch display module for example further comprises a control line 360 located within the non-display region Q2 of the base substrate 01, and the control line 360 is electrically connected at one end thereof with the touch circuit 330 and electrically connected at the other end thereof with the auxiliary circuit 340. At this time, in addition to a condition that the touch circuit 330 is configured to provide the plurality of electrode lines with display signals at the display stage and to provide the plurality of electrode lines with touch signals at the touch stage (even the touch circuit is configured to provide the auxiliary circuit with display signals through the transmission line 350 at the display stage, and to stop providing the auxiliary circuit with display signals through the transmission line 350 at the touch stage, the touch display controlling method according to embodiments of the disclosure for example further comprises: providing the auxiliary circuit with a first control signal through the control line by the touch circuit at the display stage, and providing the auxiliary circuit with a second control signal through the control line by the touch circuit at the touch stage. A process of "providing the plurality of electrode lines with the supplementary display signals by the auxiliary circuit, at the display stage" in the step 701 for example comprises: providing the plurality of electrode lines with the display signals by the auxiliary circuit, which display signals are provided by the touch circuit and function as the supplementary display signals, by the auxiliary circuit, when the first control signal is received by the auxiliary circuit. A process of "stopping providing the plurality of electrode lines with the supplementary display signals by the auxiliary circuit, at the touch stage" in the step 702 for example comprises: stopping providing the plurality of electrode lines with the display signals, by the auxiliary circuit, when the second control signal is received by the auxiliary circuit.

Exemplarily, in a condition that the auxiliary circuit 340 comprises the plurality of sub-circuits 3401, the other end of control line 360 is for example electrically connected with each of the plurality of sub-circuits 3401, respectively. The touch circuit for example provides each of the plurality of sub-circuits with the first control signal through the control line at the display stage, and provides each of the plurality of sub-circuits with the second control signal through the control line at the touch stage. Each of the plurality of sub-circuits establishes an electrical communication between the transmission line and a respective one of the plurality of electrode lines corresponding to each of the plurality of sub-circuits and in turn provides the respective one of the plurality of electrode lines with a respective display signal provided by the touch circuit, when the first control signal is received by each of the plurality of sub-circuits; and each of the plurality of sub-circuits shuts off the electrical communication between the transmission line and a respective one of the plurality of electrode lines corresponding to each of the plurality of sub-circuits so as to stop providing respective one of the plurality of electrode lines with the respective display signal, when the second control signal is received by each of the plurality of sub-circuits.

In exemplary embodiments of the disclosure, as illustrated in FIG. 6, each of the plurality of sub-circuits 3401 comprises a transistor M0. At the display stage, the transistor M0 turns on under the control of the first control signal (i.e., by establishing an electrical communication between the first electrode and the second electrode of the transistor, hereby an electrical communication is also established between the transmission line and a respective one of the plurality of electrode lines connected with the transistor, through the transistor M0), and then provides a respective one of the plurality of electrode lines with a respective display signal. At the touch stage, the transistor turns off under the control of the second control signal (hereby implementing shutting off the electrical communication between the first electrode and the second electrode of the transistor, and in turn cutting off the electrical communication between the transmission line and a respective one of the plurality of electrode lines, by cutting off the transistor M0), so as to stop providing the respective one of the plurality of electrode lines with the respective display signal.

In exemplary embodiments of the disclosure, the touch display module provided herein for example further comprises a gate driving circuit, one or more clock signal sources (such as two, four, six or eight clock signal sources) and a source driving circuit. The gate driving circuit for example comprises at least two shift register units which are cascaded, and the gate driving circuit is electrically connected to the one or more clock signal sources. It should be noted that, at the display stage, a potential of a clock signal outputted from a clock signal terminal and a potential of a data signal outputted from the source driving circuit are quite different from a potential of the touch signal provided by the touch circuit. Therefore, at the touch stage, if the clock signal is outputted by a respective clock signal source and the data signal is outputted by the source driving circuit, the touch signal on a respective electrode line will be coupled therewith. Therefore, in embodiments of the present disclosure, both the clock signal source(s) and the source driving circuit provide touch signals at the touch stage, for example, so as to reduce their influence on the touch signal provided by the touch circuit.

As illustrated in the timing sequence diagram of FIG. 8, at the display stage T1, four clock signal sources (i.e., a clock signal source CLK1, a clock signal source CLK2, a clock signal source CLK3 and a clock signal source CLK4) output respective clock signals respectively, and the source driving circuit S outputs a data signal. At this time, the potential of the first control signal outputted by the control terminal (i.e., one end connected with the control line) of the touch circuit is the first potential, the first output terminals 'a' of the touch circuit provide the plurality of electrode lines with display signals respectively, and the touch circuit also provides transistors in various sub-circuits with display signals through the second output terminal 'b', for example, via the transmission line 350. A respective transistor in each of the plurality of sub-circuits turns on when driven by the first control signal, and provides the respective one of the plurality of electrode lines with a respective display signal. The first potential is about 20V (volt), for example.

At the display stage, since both ends of each electrode line transmit display signals to the respective one of the plurality of electrode blocks simultaneously, for example, a difference between a display signal received by one of electrode blocks located at an end of the display substrate distal to (i.e., being away from) the touch circuit and a display signal received by one of electrode blocks located at an end of the display substrate proximal to (i.e., being next to) the touch circuit is hence reduced. As such, difference in display brightness across different positions of the touch display panel where the touch display module is located may be decreased, and a display uniformity of the touch display panel is improved, and the display effect is improved.

At the touch stage T2, the first output terminals 'a' of the touch circuit provide various electrode lines with touch signal Tch. Meanwhile, the touch signal Tch is outputted from the aforementioned four clock signal sources (i.e., the clock signal source CLK1, the clock signal source CLK2, the clock signal source CLK3, and the clock signal source CLK4) and source driving circuit S. Moreover, the control terminal of the touch circuit outputs the second control signal, and the potential of the second control signal is for example the second potential. Then a respective transistor in each of the plurality of sub-circuits is turned off when driven by the second control signal and stops providing the respective one of the plurality of electrode lines with the display signal. The second potential may vary in a potential range of 2V to 5V, for example.

Figure 9:
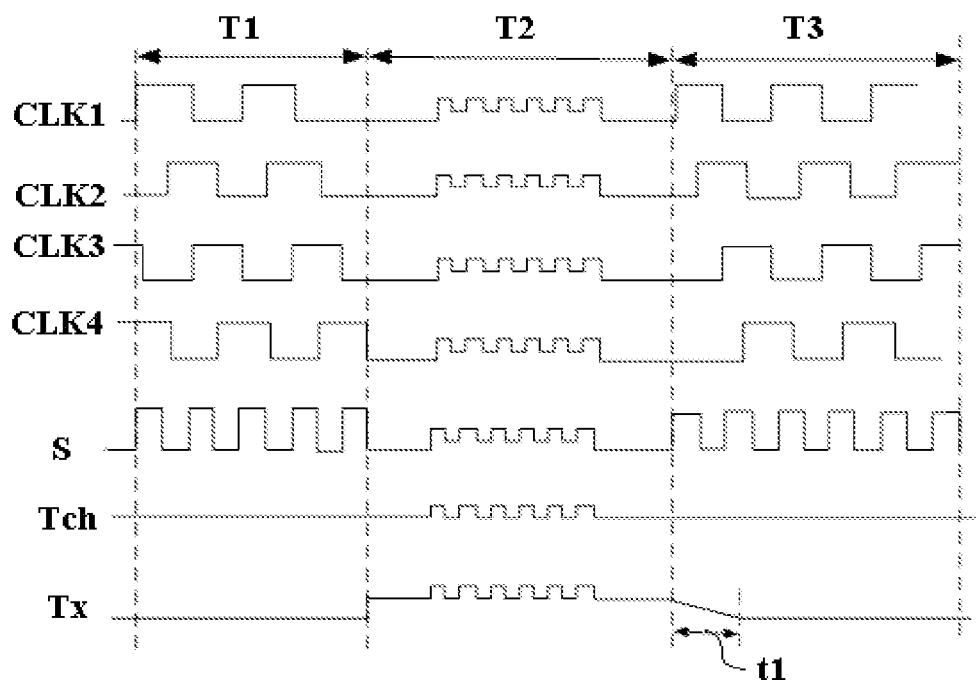
FIG. 9 illustrates a timing sequence diagram involved in another touch display controlling method according to the relevant art.

As illustrated in FIG. 8, As shown in FIG. 8, the display substrate may enter the display stage T3 again once the touch stage T2 ends. FIG. 9 illustrates a timing sequence diagram involved in another touch display controlling method according to the relevant art. As seen from FIG. 9, in a process of a transition from the touch stage T2 to the display stage T3, there appears a delay in a transition from touch signal to display signal on respective electrode line 320, and the delay duration is t1. However, in embodiments of the disclosure, the touch control circuit and the auxiliary circuit simultaneously provide a respective electrode line with the display signal. Since both ends of each electrode line are capable of receiving the display signal at the same time, then a fast transition from the touch signal to the display signal is realized on the electrode line. As seen from FIG. 8, since both the touch circuit and the auxiliary circuit are used at the same time to provide the electrode line with display signal, then the delay duration for transition from the touch signal to the display signal on the electrode line is t2, and t2 is less than t1. Therefore, as compared with the relevant art, the driving method of the display substrate provided in the present embodiment reduces the (transverse) striped patterns phenomenon caused by the delay of the display signal and improves the display effect of the touch display panel where the touch display module is located.

It should be noted that, the sequence of steps of the touch display controlling method according to embodiments of the disclosure may be adjusted appropriately, and the steps may be increased or decreased accordingly depending on the situation. Those skilled in the art may readily think of variation methods which fall within the technical scope as disclosed in the disclosure, without being repeated any more.

To sum up, the touch display module as applied in the touch display controlling method according to embodiments of the disclosure comprises not only the touch circuit arranged at one end of the display substrate, but also the auxiliary circuit arranged at the opposite end of the display substrate, and the plurality of electrode blocks and the plurality of electrode lines are located between the touch circuit and the auxiliary circuit, and both ends of each of the plurality of electrode lines are electrically connected with the touch circuit and the auxiliary circuit, respectively. Furthermore, since both the touch circuit and the auxiliary circuit are capable of providing multiple electrode lines with display signals and supplementary display signals at the display stage, respectively, then, the display signals and the supplementary display signals are for example transmitted simultaneously at both ends of each of the plurality of electrode lines, respectively, decreasing both delay and voltage drop of display signals which would have been received by electrode blocks distal to (i.e., being away from) the touch circuit in a condition in the relevant art that display signals are merely provided by a touch circuit located at one end of the base substrate.

A touch display panel is also provided in embodiments of the disclosure, for example comprising the touch display module according to embodiments of the disclosure (e.g., the touch display module as illustrated in any one of FIG. 3 to FIG. 6). The touch display panel for example is a liquid crystal touch display panel, an organic light-emitting diode (OLED) touch display panel, or a light-emitting diode touch display panel, without being specifically restricted in this connection in embodiments of the disclosure.

A display device is further provided in embodiments of the disclosure, comprising the touch display panel according to embodiments of the disclosure, and the display device may for example be electronic paper, mobile-phone, tablet computer, television, monitor, laptop computer, digital photo frame, navigator, and any products or components having display functionality.

As compared with relevant art, the touch display module, the touch display controlling method, the touch display panel, and the display device according to embodiments of the disclosure have beneficial effects, at least as below:

Since a touch circuit and an auxiliary circuit arranged respectively at both ends of the base substrate opposite to each other are arranged to provide multiple electrode lines with display signals and supplementary display signals at the display stage, respectively, then, the display signals and the supplementary display signals are for example transmitted simultaneously at both ends of each of the plurality of electrode lines, respectively, decreasing both delay and voltage drop of display signals which would have been received by electrode blocks distal to (i.e., being away from) the touch circuit in a condition in the relevant art that display signals are merely provided by a touch circuit located at one end of the base substrate.

It should be noted that the method embodiments provided in the present disclosure embodiments and the touch display module corresponding thereto may refer to each other, which are not limited by the present disclosure embodiments. It should be noted that in the drawings, the size of layers and regions may be exaggerated for the sake of clarity. It may also be understood that when an element or a layer is referred to as "on" another element or layer, it can be directly on another element or there can be an intermediate layer. In addition, it may also be understood that when an element or layer is referred to as "under" another element or layer, it can be directly under other elements, or there may be more than one intermediate layer or element. In addition, it may also be understood that when a layer or an element is referred to be "between" two layers or two elements, it is, for example, the one and only layer between two layers or two elements, or there may be more than one intermediate layer or element. Similar reference markers throughout the text indicate similar elements.

In the present disclosure, the terms "first", "second", "third" and "fourth" are used merely for descriptive purposes and may not be understood to indicate or imply relative importance. The term "multiple" or "a plurality of/the plurality of" may refer to two or more unless otherwise clearly defined.

The above are only optional embodiments of the present disclosure and are not intended to limit the disclosure. Any modification, equivalent replacement, improvement, and the like which are made within the spirit and principles of the disclosure shall be included in the scope of protection of the present disclosure.

What is claimed is:

1. A touch display controlling method of a touch display module, the touch display module comprising a base substrate, a touch circuit and an auxiliary circuit arranged respectively at both ends of the base substrate opposite to each other, and a plurality of electrode blocks and a plurality of electrode lines both being located on the base substrate; the plurality of electrode blocks and the plurality of electrode lines being arranged in one-to-one correspondence, and are all located between the touch circuit and the auxiliary circuit, each of the plurality of electrode lines being electrically connected at one end thereof with the touch circuit and electrically connected at the other end thereof with the auxiliary circuit, and portions of each of the plurality of electrode lines between the one end and the other end thereof being electrically connected with a respective one of the plurality of electrode blocks, the method comprising:

providing the plurality of electrode lines with the display signals by the touch circuit, and providing the plurality of electrode lines with the supplementary display signals by the auxiliary circuit, at a display stage; and providing the plurality of electrode lines with the touch signals by the touch circuit, and stopping providing the plurality of electrode lines with the supplementary display signals by the auxiliary circuit, at a touch stage, wherein in response to a condition that the touch display module comprises a transmission line, which is located within a non-display region situating at a periphery of the base substrate and surrounding and defining a display region located inside the base substrate, and the transmission line is electrically connected at one end thereof with the touch circuit and electrically connected at the other end thereof with the auxiliary circuit, the method further comprises: providing the auxiliary circuit with the display signals through the transmission line by the touch circuit, at the display stage; and the step "providing the plurality of electrode lines with the supplementary display signals by the auxiliary circuit" comprises: providing the plurality of electrode lines with the display signals by the auxiliary circuit, which display signals are provided by the touch circuit and function as the supplementary display signals, wherein in response to a condition that the touch display module further comprises a control line, which is located within a non-display region situating at a periphery of the base substrate and surrounding and defining a display region located inside the base substrate, and the control line is electrically connected at one end thereof with the touch circuit and electrically connected at the other end thereof with the auxiliary circuit, the method further comprises: providing the auxiliary circuit with a first control signal through the control line by the touch circuit at the display stage, and providing the auxiliary circuit with a second control signal through the control line by the touch circuit at the touch stage;

the step "providing the plurality of electrode lines with the display signals by the auxiliary circuit, which display signals are provided by the touch circuit and function as the supplementary display signals" comprises: providing the plurality of electrode lines with the display signals by the auxiliary circuit, which display signals are provided by the touch circuit and function as the supplementary display signals, by the auxiliary circuit, in response to the first control signal being received by the auxiliary circuit; and the step "stopping providing the plurality of electrode lines with the supplementary display signals by the auxiliary circuit" comprises: stopping providing the plurality of electrode lines with the display signals, by the auxiliary circuit, in response to the second control signal being received by the auxiliary circuit.

2. The method according to claim 1, wherein each of the display signals and the supplementary display signals comprises a common voltage signal.

3. The method according to claim 1, wherein in response to a condition that the auxiliary circuit comprises a plurality of sub-circuits electrically connected with the plurality of electrode lines in one-to-one correspondence, respectively, and the plurality of sub-circuits are electrically connected with both the control line and the transmission line, the step "providing the plurality of electrode lines with the display signals by the auxiliary circuit, which display signals are provided by the touch circuit and function as the supplementary display signals, by the auxiliary circuit, in response to the first control signal being received by the auxiliary circuit" comprises: establishing an electrical communication between the transmission line and a respective one of the plurality of electrode lines corresponding to each of the plurality of sub-circuits and in turn providing the respective one of the plurality of electrode lines with a respective display signal provided by the touch circuit, in response to the first control signal being received by each of the plurality of sub-circuits; and the step "stopping providing the plurality of electrode lines with the display signals, by the auxiliary circuit, in response to the second control signal being received by the auxiliary circuit" comprises: shutting off the electrical communication between the transmission line and the respective one of the plurality of electrode lines corresponding to each of the plurality of sub-circuits so as to stop providing the respective one of the plurality of electrode lines with the respective display signal provided by the touch circuit, in response to the second control signal being received by each of the plurality of sub-circuits.

* * * * *